United States Patent
Zhang et al.

(10) Patent No.: US 11,770,842 B2
(45) Date of Patent: Sep. 26, 2023

(54) SUPPORT OF SIMULTANEOUS UNICAST AND MULTICAST MONITORING

(71) Applicant: QUALCOMM Incorporated, San Diego, CA (US)

(72) Inventors: Xiaoxia Zhang, San Diego, CA (US); Jing Sun, San Diego, CA (US); Mostafa Khoshnevisan, San Diego, CA (US); Tao Luo, San Diego, CA (US); Wooseok Nam, San Diego, CA (US); Le Liu, Fremont, CA (US); Kazuki Takeda, Tokyo (JP); Alberto Rico Alvarino, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 16/948,568

(22) Filed: Sep. 23, 2020

(65) Prior Publication Data

US 2021/0105741 A1    Apr. 8, 2021

Related U.S. Application Data

(60) Provisional application No. 62/911,721, filed on Oct. 7, 2019.

(51) Int. Cl.
*H04W 72/30* (2023.01)
*H04L 12/18* (2006.01)
*H04W 72/0446* (2023.01)

(52) U.S. Cl.
CPC ........... *H04W 72/30* (2023.01); *H04L 12/189* (2013.01); *H04W 72/0446* (2013.01)

(58) Field of Classification Search
CPC .......... H04W 72/005; H04W 72/0446; H04W 72/042; H04W 72/046; H04W 76/40;
(Continued)

(56) References Cited

U.S. PATENT DOCUMENTS

2008/0080471 A1* 4/2008 Rinne ..................... H04L 12/18
                                                                      370/343
2012/0314591 A1* 12/2012 Zhang ................... H04L 27/266
                                                                      370/252
(Continued)

FOREIGN PATENT DOCUMENTS

WO      2013069960 A1    5/2013
WO   WO-2013069960 A1    5/2013

OTHER PUBLICATIONS

C. Hu, Y. Liu, L. Wang and M. Song, "Power Allocation in Cellular Systems with Multicast and Unicast Hybrid Service," 2012 8th International Conference on Wireless Communications, Networking and Mobile Computing, Shanghai, China, 2012, pp. 1-4 (Year: 2012).*

(Continued)

*Primary Examiner* — Thinh D Tran
(74) *Attorney, Agent, or Firm* — Harrity & Harrity, LLP

(57) ABSTRACT

Various aspects of the present disclosure generally relate to wireless communication. In some aspects, a user equipment may transmit an indication of one or more beams for simultaneous unicast and multicast monitoring and receive, using the one or more beams, at least one of unicast traffic or multicast traffic. Numerous other aspects are provided.

24 Claims, 19 Drawing Sheets

(58) Field of Classification Search
CPC . H04L 12/189; H04L 5/0092; H04L 12/1836; H04L 5/0051; H04L 5/0023; H04B 7/088; H04B 7/0695
See application file for complete search history.

(56) References Cited

U.S. PATENT DOCUMENTS

| | | | | |
|---|---|---|---|---|
| 2013/0286960 | A1* | 10/2013 | Li | H04B 7/0617 370/329 |
| 2017/0273058 | A1* | 9/2017 | Agiwal | H04B 7/0617 |
| 2018/0234807 | A1* | 8/2018 | Park | H04W 4/06 |
| 2019/0082352 | A1* | 3/2019 | Hua | H04W 76/15 |
| 2019/0394707 | A1* | 12/2019 | Wong | H04W 4/70 |
| 2021/0211228 | A1* | 7/2021 | Lee | H04L 1/00 |
| 2021/0315032 | A1* | 10/2021 | Hu | H04W 8/24 |

OTHER PUBLICATIONS

Juergen Carstens, "Combined Multicast and Unicast Scheduling for Multicast Applications", ip.com, Apr. 24, 2008 (Year: 2008).*
CATT: "PDCCH Enhancements for URLLC," 3GPP Draft, 3GPP TSG RAN WG1 Meeting #98bis, R1-1910341, PDCCH Enhancements for URLLC-Final, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 5, 2019 (Oct. 5, 2019), XP051808522, 15 pages, Retrieved from the Internet: URL: https://ftp.3gpp.org/tsg_ran/WG1_RL1/TSGR1_98b/Docs/R1-1910341.zip R1-1910341 PDCCH enhancements for URLLC-final.docx [retrieved on Oct. 5, 2019] the whole document.
Convida Wireless: "On Physical Layer Structure for NR V2X Sidelink," 3GPP Draft, 3GPP TSG-RAN WG1 Meeting #98, R1-1909419 ON_PHY_STRUCT_NR_V2X_SL, 3rd Generation Partnership Project (3GPP), Mobile Competence Centre, 650, Route Des Lucioles, F-06921, Sophia-Antipolis Cedex, France, vol. RAN WG1. No. Prague, CZ, Aug. 26, 2019-Aug. 30, 2019, Aug. 17, 2019 (Aug. 17, 2019), XP051766024, 5 pages, Retrieved from the Internet: URL: http://www.3gpp.org/ftp/tsg_ran/WG1_RL1/TSGR1_98/Docs/R1-1909419.zip [retrieved on Aug. 17, 2019] the whole document.
Fraunhofer HHI., et al., "Design of NR V2X Physical Layer Structures," 3GPP Draft, 3GPP TSG RAN WG1 #98, R1-1908677, PhyLayerStruct, 3rd Generation Partnership Project (3GPP), Mobile Competence Centre, 650, Route Des Lucioles, F-06921, Sophia-Antipolis Cedex, France, vol. RAN WG1. No. Prague, CZ, Aug. 26, 2019-Aug. 30, 2019, Aug. 16, 2019 (Aug. 16, 2019), XP051765285, 14 pages, Retrieved from the Internet: URL: http://www.3gpp.org/ftp/tsg_ran/WG1_RL1/TSGR1_98/Docs/R1-1908677.zip [retrieved on Aug. 16, 2019] the whole document.
Huawei, et al., "Sidelink Physical Layer Procedures for NR V2X", 3GPP TSG RAN WG1 Meeting #95, 3GPP Draft, R1-1812205, vol. RAN WG1. No. Spokane. USA, Nov. 12, 2018-Nov. 16, 2018, Nov. 3, 2018 (Nov. 3, 2018), XP051478361, 12 pages, Retrieved from the Internet: URL: http://www.3gpp.org/ftp/tsg%5Fran/WG1%5FRL1/TSGR1%5F95/Docs/R1%2D1812205%2Ezip. [retrieved on Nov. 3, 2018] Sections 1-8.
International Search Report and Written Opinion—PCT/US2020/070576—ISA/EPO—dated Apr. 8, 2021.
Partial International Search Report—PCT/US2020/070576—ISA/EPO—dated Jan. 25, 2021.
Qualcomm Incorporated: "Maintenance for Physical Downlink Control Channel," 3GPP Draft, 3GPP TSG RAN WG1 Meeting #94, R1-1809426, Maintenance for Physical Downlink Control Channel, 3rd Generation Partnership Project (3GPP), Mobile Competence Centre, 650, Route Des Lucioles, F-06921, Sophia-Antipolis Cedex, France, vol. RAN WG1. No. Gothenburg. Sweden, Aug. 20, 2018-Aug. 24, 2018, Aug. 11, 2018 (Aug. 11, 2018), XP051516789, 16 pages, Retrieved from the Internet: URL: http://www.3gpp.org/ftp/tsg%5Fran/WG1%5FRL1/TSGR1%5F94/Docs/R1%2D1809426%2Ezip [retrieved on Aug. 11, 2018] the whole document.
Qualcomm Incorporated: "PDCCH Enhancements for eURLLC," 3GPP Draft, 3GPP TSG-RAN WG1 Meeting #98, R1-1909264, PDCCH Enhancements for EURLLC, 3rd Generation Partnership Project (3GPP), Mobile Competence Centre, 650, Route Des Lucioles, F-06921, Sophia-Antipolis Cedex, France, vol. RAN WG1. No. Prague, Czech Republic, Aug. 26, 2019-Aug. 30, 2019, Aug. 17, 2019 (Aug. 17, 2019), XP051765869, 14 pages, Retrieved from the Internet: URL: http://www.3gpp.org/ftp/tsg_ran/WG1_RL1/TSGR1_98/Docs/R1-1909264.zip [retrieved on Aug. 17, 2019] the whole document.
European Search Report—EP23154871—Search Authority—Munich—dated Apr. 25, 2023.

* cited by examiner

SUPPORT OF SIMULTANEOUS UNICAST AND MULTICAST MONITORING

CROSS-REFERENCE TO RELATED APPLICATION

This Patent Application claims priority to U.S. Provisional Patent Application No. 62/911,721, filed on Oct. 7, 2019, entitled "SUPPORT OF SIMULTANEOUS UNICAST AND MULTICAST MONITORING," and assigned to the assignee hereof. The disclosure of the prior Application is considered part of and is incorporated by reference into this Patent Application.

FIELD OF THE DISCLOSURE

Aspects of the present disclosure generally relate to wireless communication, and specifically, to techniques and apparatuses for supporting simultaneous unicast and multicast monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, a user equipment (UE) may communicate on a downlink with one or more base stations (BSs) to receive unicast traffic (traffic that is directed to a particular UE) or multicast traffic (traffic that is directed to multiple UEs). In some cases, a UE may be capable of simultaneously monitoring for unicast traffic and multicast traffic. In this case, the UE may be capable of monitoring for unicast traffic and multicast traffic in the same time-domain resources (for example, the same orthogonal frequency division multiplexing (OFDM) symbols or the same slots). However, additional signaling may be needed to efficiently configure the UE to perform simultaneous monitoring for unicast traffic and multicast traffic.

SUMMARY

In some aspects, a method of wireless communication, performed by a user equipment (UE), may include transmitting an indication of one or more beams for simultaneous unicast and multicast monitoring; and receiving, using the one or more beams, at least one of unicast traffic or multicast traffic.

In some aspects, a method of wireless communication, performed by a UE, may include determining a timing offset between unicast traffic reception and multicast traffic reception; and transmitting an indication of the timing offset.

In some aspects, a method of wireless communication, performed by a base station (BS), may include receiving an indication of a timing offset between unicast traffic reception and multicast traffic reception; and transmitting an indication of a time gap between one or more first time-domain resources configured for unicast traffic and one or more second time-domain resources configured for multicast traffic, the time gap being based at least in part on the timing offset.

In some aspects, a method of wireless communication, performed by a BS, may include transmitting a first indication that one or more first time-domain resources, of a plurality of time-domain resources that are permitted to be flexibly configured for unicast traffic or multicast traffic, are configured for unicast-only traffic; and transmitting a second indication that one or more second time-domain resources, included in the plurality of time-domain resources, are configured for multicast-only traffic.

In some aspects, a method of wireless communication, performed by a UE, may include receiving an indication that one or more time-domain resources, of a plurality of time-domain resources, that are permitted to be flexibly configured for unicast traffic or multicast traffic, are configured for unicast-only traffic or for multicast-only traffic; and receiving unicast-only traffic or multicast-only traffic in the one or more time-domain resources.

In some aspects, a method of wireless communication, performed by a UE, may include receiving a first DCI communication from a unicast TRP, the first DCI communication configuring one or more first time-domain resources for unicast traffic reception; and receiving a second DCI communication from a multicast TRP, the second DCI communication configuring one or more second time-domain resources for multicast traffic reception.

In some aspects, a method of wireless communication, performed by a UE, may include transmitting a first indication of a capability of the UE to support simultaneous unicast and multicast monitoring; and transmitting at least one of a second indication of a quantity of frequency carriers that the UE supports for simultaneous unicast and multicast monitoring or a third indication of a dual connectivity capability of the UE for simultaneous unicast and multicast monitoring.

In some aspects, a UE for wireless communication may include memory and one or more processors operatively coupled to the memory. The memory and the one or more processors may be configured to transmit an indication of one or more beams for simultaneous unicast and multicast monitoring; and receive, using the one or more beams, at least one of unicast traffic or multicast traffic.

In some aspects, a UE for wireless communication may include memory and one or more processors operatively coupled to the memory. The memory and the one or more processors may be configured to determine a timing offset between unicast traffic reception and multicast traffic reception; and transmit an indication of the timing offset.

In some aspects, a BS for wireless communication may include memory and one or more processors operatively coupled to the memory. The memory and the one or more processors may be configured to receive an indication of a timing offset between unicast traffic reception and multicast traffic reception; and transmit an indication of a time gap between one or more first time-domain resources configured for unicast traffic and one or more second time-domain resources configured for multicast traffic, the time gap being based at least in part on the timing offset.

In some aspects, a BS for wireless communication may include memory and one or more processors operatively coupled to the memory. The memory and the one or more processors may be configured to transmit a first indication that one or more first time-domain resources, of a plurality of time-domain resources that are permitted to be flexibly configured for unicast traffic or multicast traffic, are configured for unicast-only traffic; and transmit a second indication that one or more second time-domain resources, included in the plurality of time-domain resources, are configured for multicast-only traffic.

In some aspects, a UE for wireless communication may include memory and one or more processors operatively coupled to the memory. The memory and the one or more processors may be configured to receive an indication that one or more time-domain resources, of a plurality of time-domain resources, that are permitted to be flexibly configured for unicast traffic or multicast traffic, are configured for unicast-only traffic or for multicast-only traffic; and receive unicast-only traffic or multicast-only traffic in the one or more time-domain resources.

In some aspects, a UE for wireless communication may include memory and one or more processors operatively coupled to the memory. The memory and the one or more processors may be configured to receive a first DCI communication from a unicast TRP, the first DCI communication configuring one or more first time-domain resources for unicast traffic reception; and receive a second DCI communication from a multicast TRP, the second DCI communication configuring one or more second time-domain resources for multicast traffic reception.

In some aspects, a UE for wireless communication may include memory and one or more processors operatively coupled to the memory. The memory and the one or more processors may be configured to transmit a first indication of a capability of the UE to support simultaneous unicast and multicast monitoring; and transmit at least one of a second indication of a quantity of frequency carriers that the UE supports for simultaneous unicast and multicast monitoring or a third indication of a dual connectivity capability of the UE for simultaneous unicast and multicast monitoring.

In some aspects, a non-transitory computer-readable medium may store one or more instructions for wireless communication. The one or more instructions, when executed by one or more processors of a UE, may cause the one or more processors to transmit an indication of one or more beams for simultaneous unicast and multicast monitoring; and receive, using the one or more beams, at least one of unicast traffic or multicast traffic.

In some aspects, a non-transitory computer-readable medium may store one or more instructions for wireless communication. The one or more instructions, when executed by one or more processors of a UE, may cause the one or more processors to determine a timing offset between unicast traffic reception and multicast traffic reception; and transmit an indication of the timing offset.

In some aspects, a non-transitory computer-readable medium may store one or more instructions for wireless communication. The one or more instructions, when executed by one or more processors of a BS, may cause the one or more processors to receive an indication of a timing offset between unicast traffic reception and multicast traffic reception; and transmit an indication of a time gap between one or more first time-domain resources configured for unicast traffic and one or more second time-domain resources configured for multicast traffic, the time gap being based at least in part on the timing offset.

In some aspects, a non-transitory computer-readable medium may store one or more instructions for wireless communication. The one or more instructions, when executed by one or more processors of a BS, may cause the one or more processors to transmit a first indication that one or more first time-domain resources, of a plurality of time-domain resources that are permitted to be flexibly configured for unicast traffic or multicast traffic, are configured for unicast-only traffic; and transmit a second indication that one or more second time-domain resources, included in the plurality of time-domain resources, are configured for multicast-only traffic.

In some aspects, a non-transitory computer-readable medium may store one or more instructions for wireless communication. The one or more instructions, when executed by one or more processors of a UE, may cause the one or more processors to receive an indication that one or more time-domain resources, of a plurality of time-domain resources, that are permitted to be flexibly configured for unicast traffic or multicast traffic, are configured for unicast-only traffic or for multicast-only traffic; and receive unicast-only traffic or multicast-only traffic in the one or more time-domain resources.

In some aspects, a non-transitory computer-readable medium may store one or more instructions for wireless communication. The one or more instructions, when executed by one or more processors of a UE, may cause the one or more processors to receive a first DCI communication from a unicast TRP, the first DCI communication configuring one or more first time-domain resources for unicast traffic reception; and receive a second DCI communication from a multicast TRP, the second DCI communication configuring one or more second time-domain resources for multicast traffic reception.

In some aspects, a non-transitory computer-readable medium may store one or more instructions for wireless communication. The one or more instructions, when executed by one or more processors of a UE, may cause the one or more processors to transmit a first indication of a capability of the UE to support simultaneous unicast and multicast monitoring; and transmit at least one of a second indication of a quantity of frequency carriers that the UE supports for simultaneous unicast and multicast monitoring or a third indication of a dual connectivity capability of the UE for simultaneous unicast and multicast monitoring.

In some aspects, an apparatus for wireless communication may include means for transmitting an indication of one or more beams for simultaneous unicast and multicast monitoring; and means for receiving, using the one or more beams, at least one of unicast traffic or multicast traffic.

In some aspects, an apparatus for wireless communication may include means for determining a timing offset between unicast traffic reception and multicast traffic reception; and means for transmitting an indication of the timing offset.

In some aspects, an apparatus for wireless communication may include means for receiving an indication of a timing offset between unicast traffic reception and multicast traffic reception; and means for transmitting an indication of a time gap between one or more first time-domain resources configured for unicast traffic and one or more second time-domain resources configured for multicast traffic, the time gap being based at least in part on the timing offset.

In some aspects, an apparatus for wireless communication may include means for transmitting a first indication that one or more first time-domain resources, of a plurality of time-domain resources that are permitted to be flexibly configured for unicast traffic or multicast traffic, are configured for unicast-only traffic; and means for transmitting a second indication that one or more second time-domain resources, included in the plurality of time-domain resources, are configured for multicast-only traffic.

In some aspects, an apparatus for wireless communication may include means for receiving an indication that one or more time-domain resources, of a plurality of time-domain resources, that are permitted to be flexibly configured for unicast traffic or multicast traffic, are configured for unicast-only traffic or for multicast-only traffic; and means for receiving unicast-only traffic or multicast-only traffic in the one or more time-domain resources.

In some aspects, an apparatus for wireless communication may include means for receiving a first DCI communication from a unicast TRP, the first DCI communication configuring one or more first time-domain resources for unicast traffic reception; and means for receiving a second DCI communication from a multicast TRP, the second DCI communication configuring one or more second time-domain resources for multicast traffic reception.

In some aspects, an apparatus for wireless communication may include means for transmitting a first indication of a capability of the apparatus to support simultaneous unicast and multicast monitoring; and means for transmitting at least one of a second indication of a quantity of frequency carriers that the apparatus supports for simultaneous unicast and multicast monitoring or a third indication of a dual connectivity capability of the UE for simultaneous unicast and multicast monitoring.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
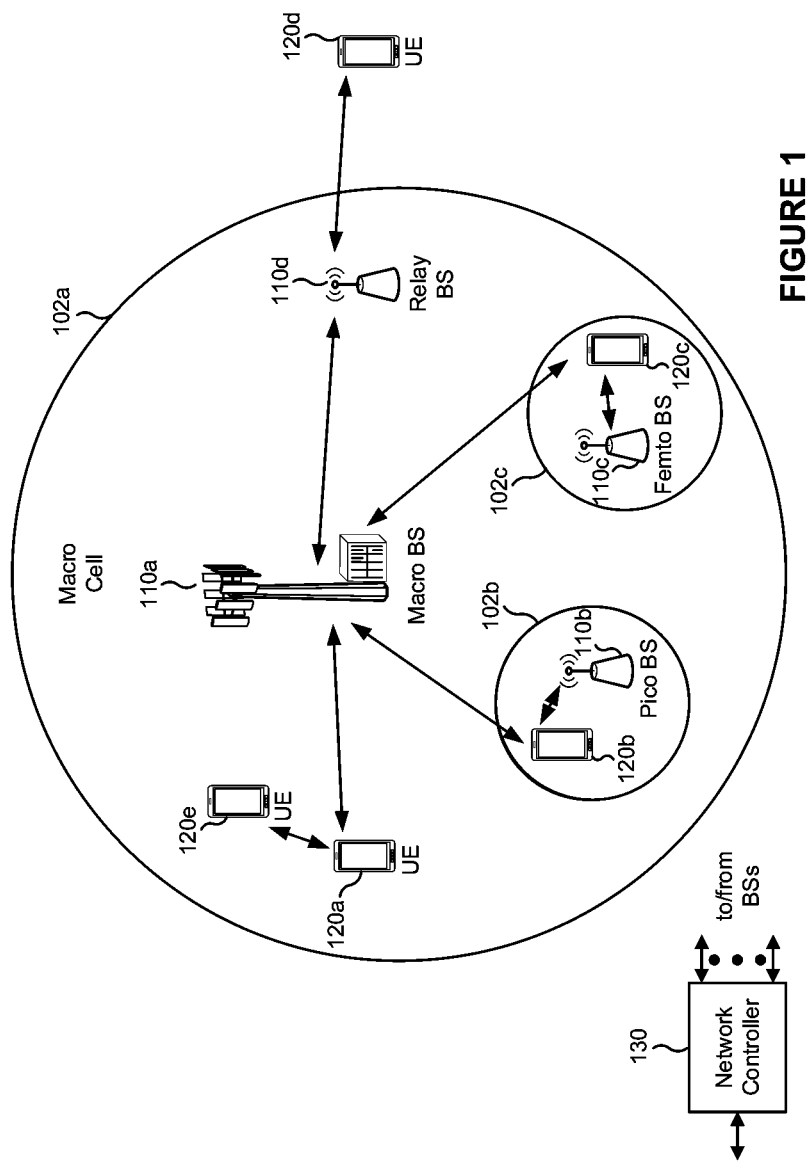
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

In a wireless network, a user equipment (UE) may communicate on a downlink with one or more base stations (BSs) to receive unicast traffic (traffic that is directed to a particular UE) or multicast traffic (traffic that is directed to multiple UEs). In some cases, a UE may be capable of simultaneously monitoring for unicast traffic and multicast traffic. In this case, the UE may be capable of monitoring for unicast traffic and multicast traffic in the same time-domain resources (for example, the same orthogonal frequency division multiplexing (OFDM) symbols, the same slots, or a combination thereof). However, additional signaling may be needed to efficiently configure the UE to perform simultaneous monitoring for unicast traffic and multicast traffic.

For example, the UE may be configured to simultaneously monitor for unicast traffic and multicast traffic on a set of beams (for example, one or more beams) that is configured for unicast-only traffic or multicast-only traffic, which may be a less efficient set of beams relative to another set of beams. As another example, a fast Fourier transform (FFT) timing window of the UE for unicast traffic reception may be different from an FFT timing window of the UE for multicast traffic reception. If the timing of resources configured for unicast traffic reception and resources configured for multicast traffic reception does not permit the UE to switch between using different FFT timing windows, the UE may resort to using the same FFT timing window for both unicast traffic reception and multicast traffic reception, which may result in inefficient FFT processing or dropped traffic, among other examples.

Some aspects described herein provide techniques and apparatuses for supporting simultaneous unicast and multicast monitoring. In some aspects, a UE may transmit, to a BS, an indication of one or more first parameters for simultaneous unicast and multicast monitoring. The one or more first parameters may be based at least in part on one or more capabilities of the UE, one or more measurements performed by the UE, or other factors, and may indicate one or more beams for simultaneous unicast and multicast monitoring, a timing offset between an FFT timing window for unicast traffic reception and an FFT timing window for multicast traffic reception, a carrier aggregation capability for simultaneous unicast and multicast monitoring, a dual connectivity capability for simultaneous unicast and multicast monitoring, or other parameters.

The BS may receive the one or more first parameters, may configure one or more second parameters for simultaneous unicast and multicast monitoring, may transmit an indication of the one or more second parameters to the UE, and may transmit at least one of unicast traffic or multicast traffic to the UE based at least in part on the one or more first parameters and the one or more second parameters. The one or more second parameters may include an early indication of resources configured for unicast traffic and resources configured for multicast traffic, an indication of a time gap between the resources configured for unicast traffic and the resources configured for multicast traffic, or other parameters.

The indication of the one or more first parameters and the configuration of the one or more second parameters may permit efficient simultaneous unicast and multicast monitoring by the UE. For example, the one or more first parameters and the one or more second parameters may permit the UE to simultaneously monitor for unicast traffic and multicast traffic using a set of beams specifically selected for simultaneous unicast and multicast monitoring. As another example, the timing offset between the FFT timing window for unicast traffic reception and the FFT timing window for multicast traffic reception may provide the UE with sufficient timing to switch between using the FFT timing window for unicast traffic reception and the FFT timing window for multicast traffic reception. As another example, the early indication of the resources configured for unicast traffic and the resources configured for multicast traffic may permit the UE to monitor for unicast-only traffic or for multicast-only traffic in subsets of resources that are permitted to be flexibly configured for unicast traffic or multicast traffic.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of BSs 110 (shown as BS 110*a*, BS 110*b*, BS 110*c*, and BS 110*d*) and other network entities. A BS is an entity that communicates with UE(s) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, or the like, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, or the like, or combinations thereof.

UEs 120 (for example, 120*a*, 120*b*, 120*c*) may be dispersed throughout the wireless network, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
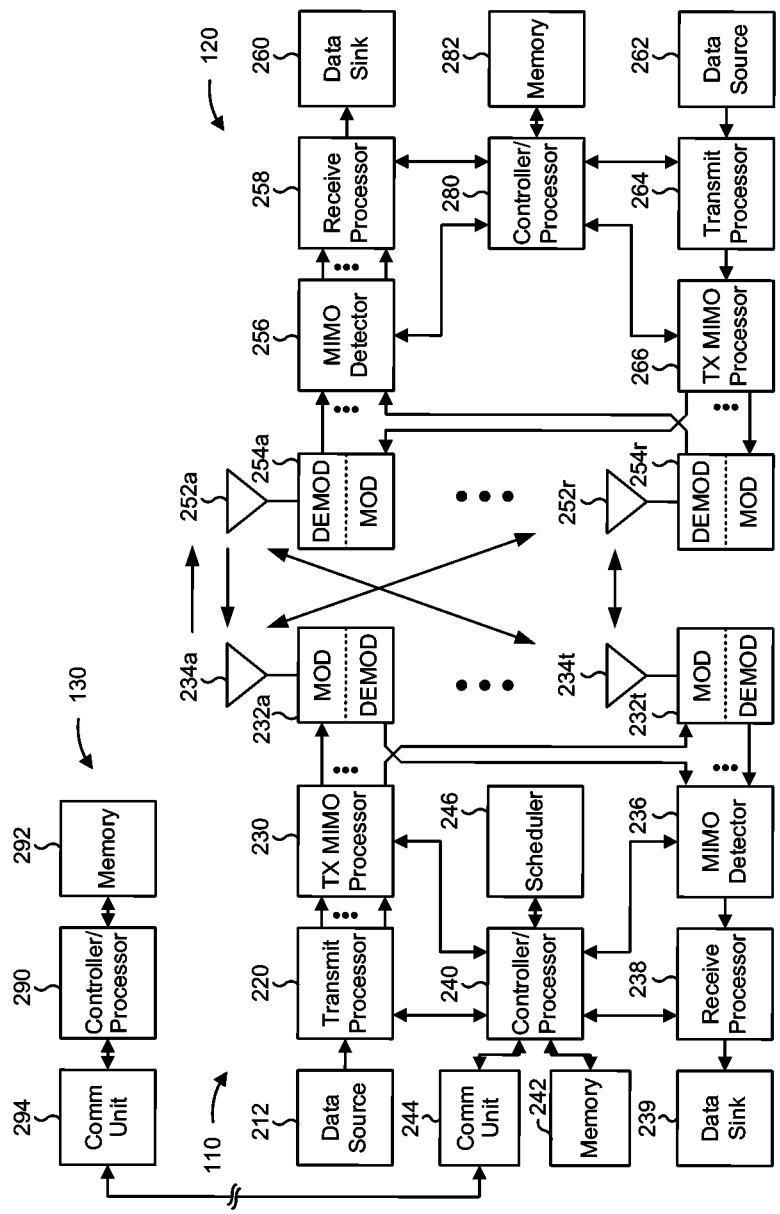
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with supporting simultaneous unicast and multicast monitoring, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, process 600 of FIG. 6, process 700 of FIG. 7, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, UE 120 may include means for transmitting an indication of one or more beams for simultaneous unicast and multicast monitoring, means for receiving, using the one or more beams, at least one of unicast traffic or multicast traffic, or the like, or combinations thereof. In some aspects, UE 120 may include means for determining a timing offset between unicast traffic reception and multicast traffic reception, means for transmitting an indication of the timing offset, or the like, or combinations thereof. In some aspects, UE 120 may include means for receiving an indication that one or more time-domain resources, of a plurality of time-domain resources, that are permitted to be flexibly configured for unicast traffic or multicast traffic, are configured for unicast-only traffic or for multicast-only traffic, means for receiving unicast-only traffic or multicast-only traffic in the one or more time-domain resources, or the like, or combinations thereof. In some aspects, UE 120 may include means for transmitting a first indication of a capability of the UE 120 to support simultaneous unicast and multicast monitoring, means for transmitting at least one of a second indication of a quantity of frequency carriers that the UE 120 supports for simultaneous unicast and multicast monitoring or a third indication of a dual connectivity capability of the UE for simultaneous unicast and multicast monitoring, or the like, or combinations thereof. In some aspects, UE 120 may include means for receiving a first DCI communication from a unicast TRP, the first DCI communication configuring one or more first time-domain resources for unicast traffic reception, means for receiving a second DCI communication from a multicast TRP, the second DCI communication configuring one or more second time-domain resources for multicast traffic reception, or the like, or combinations thereof. In some aspects, such means may include one or more components of UE 120 described in connection with FIG. 2.

In some aspects, BS 110 may include means for receiving an indication of a timing offset between unicast traffic reception and an multicast traffic reception, means for transmitting an indication of a time gap between one or more first time-domain resources configured for unicast traffic and one or more second time-domain resources configured for multicast traffic, the time gap being based at least in part on the timing offset, or the like, or combinations thereof. In some aspects, BS 110 may include means for transmitting a first indication that one or more first time-domain resources, of a plurality of time-domain resources that are permitted to be flexibly configured for unicast traffic or multicast traffic, are configured for unicast-only traffic, means for transmitting a second indication that one or more second time-domain resources, included in the plurality of time-domain resources, are configured for multicast-only traffic, or the like, or combinations thereof. In some aspects, such means may include one or more components of base station 110 described in connection with FIG. 2.

FIGS. 3A-3F are diagrams illustrating one or more examples of supporting simultaneous unicast and multicast monitoring in accordance with various aspects of the present disclosure. In some aspects, the one or examples may include examples of communication between a UE, such as UE 120, and a BS, such a BS 110. In some aspects, the UE and the BS may be included in a wireless network, such as the wireless network described above in connection with FIG. 1 or another wireless network. In some aspects, the one or more examples may include a greater quantity of UEs, a greater quantity of BSs, or a combination thereof.

In some aspects, the UE and the BS may communicate on an access link, which may include an uplink and a downlink. In some aspects, the BS may transmit downlink traffic to the UE on the downlink. The downlink traffic may include unicast traffic, multicast traffic (or broadcast traffic), or a combination thereof. In such examples, the UE may be configured to monitor for unicast traffic in one or more sets of unicast-only monitoring resources (which may include one or more OFDM symbols, one or more slots, one or more subcarriers, or a combination thereof), may be configured to monitor for multicast traffic in one or more sets of multicast-only monitoring resources (which may include one or more OFDM symbols, one or more slots, one or more subcarriers, or a combination thereof), and may be configured to simultaneously monitor for unicast traffic and multicast traffic in one or more sets of resources (which may include one or more OFDM symbols, one or more slots, one or more subcarriers, or a combination thereof) that are permitted to be flexibly configured by the BS.

In some cases, the BS may be unaware of various UE capabilities or operating conditions that may affect the capability of the UE to support simultaneous unicast and multicast monitoring. As a result, the BS may configure the transmission of unicast traffic and multicast traffic in a manner that may be inefficient for the UE or incompatible with the UE's capabilities.

Figure 3A:
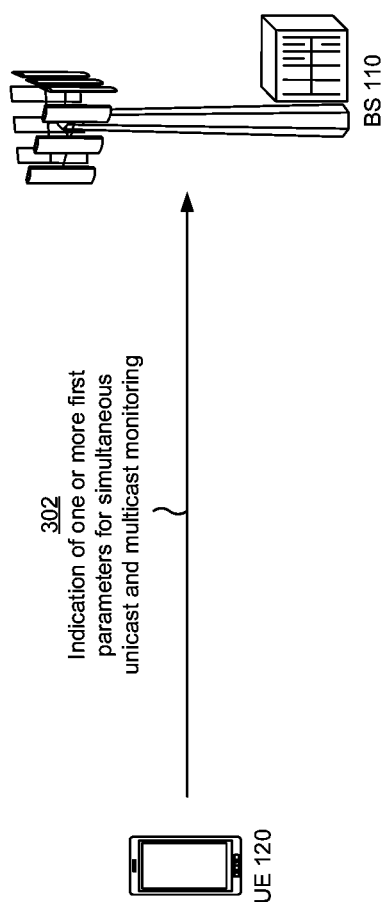
FIGS. 3A-3F are diagrams illustrating one or more examples of supporting simultaneous unicast and multicast monitoring in accordance with various aspects of the present disclosure.

As indicated by reference number 302 in FIG. 3A, to enable the BS to efficiently configure simultaneous unicast and multicast monitoring for the UE, the UE may transmit an indication of one or more first parameters to the BS. The one or more first parameters may be parameters for simultaneous unicast and multicast monitoring. In some aspects, the one or more first parameters may further include parameters for unicast-only monitoring, parameters for multicast-only monitoring, or a combination thereof.

In some aspects, the one or more first parameters may include a capability of the UE to support simultaneous unicast and multicast monitoring (that is, an indication that the UE supports simultaneous unicast and multicast monitoring). In some aspects, the one or more first parameters may include an indication of a carrier aggregation capability of the UE, an indication of a dual connectivity capability of the UE, or a combination thereof. In some cases, the BS may configure a multicast bandwidth part (BWP) and a unicast BWP with different numerologies or other different configurations. For example, the BS may configure the multicast BWP to have a larger cyclic prefix relative to the unicast BWP to account for single frequency network multicast traffic that is transmitted from multiple transmission reception points (TRPs) (which may be implemented by one or more BSs 110). As another example, the multicast BWP and the unicast BWP may be subject to asynchronous timing.

The above-described different configurations of the multicast BWP and the unicast BWP may result in different carrier aggregation or dual connectivity capabilities of the UE for simultaneously monitoring for unicast traffic and multicast traffic relative to unicast-only monitoring or multicast-only monitoring. Accordingly, the carrier aggregation capability of the UE may indicate a capability of the UE to support carrier aggregation while simultaneously monitoring for unicast traffic and multicast traffic or may identify a quantity of carriers that the UE is capable of supporting for carrier aggregation while simultaneously monitoring for unicast traffic and multicast traffic, among other examples. The dual connectivity capability of the UE may identify a capability of the UE to support dual connectivity (for example, the capability to be simultaneously connected to a plurality of BSs or TRPs) while simultaneously monitoring for unicast traffic and multicast traffic.

In some aspects, the one or more first parameters may indicate one or more beams for unicast-only monitoring, one or more beams for multicast-only monitoring, one or more beams for simultaneous unicast and multicast monitoring, or a combination thereof. If the best or most efficient beams for unicast-only monitoring, multicast-only monitoring, and simultaneous unicast and multicast monitoring do not align, the UE may indicate different beams for unicast-only monitoring, multicast-only monitoring, and simultaneous unicast and multicast monitoring.

Figure 3B:
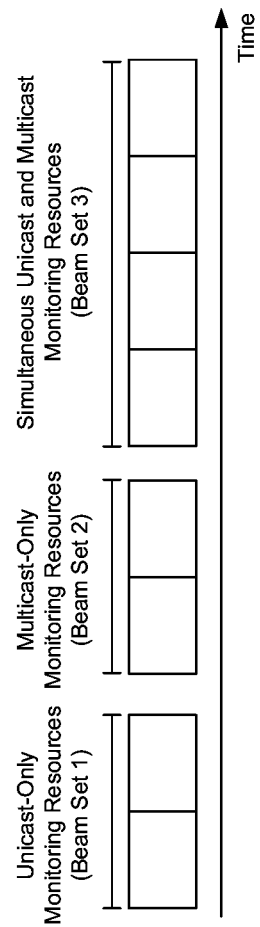

As an example, and as illustrated in FIG. 3B, the UE may indicate one or more beams (Beam Set 1) for unicast-only monitoring, may indicate one or more beams (Beam Set 2) for multicast-only monitoring, and may indicate one or more beams (Beam Set 3) for simultaneous unicast and multicast monitoring. The beams included in Beam Set 1, Beam Set 2, and Beam Set 3 may be the same beams, different beams, or a combination thereof. In this way, the BS may configure the UE to use Beam Set 1 for unicast-only monitoring resources configured by the BS, may configure the UE to use Beam Set 2 for multicast-only monitoring resources configured by the BS, and may configure the UE to use Beam Set 3 for simultaneous unicast and multicast monitoring resources configured by the BS.

In some aspects, the one or more first parameters may include a timing offset between an FFT timing window for unicast traffic reception and an FFT timing window for multicast traffic reception. An FFT timing window may include a timing window for converting an analog signal, received at the UE, to digital data. A unicast FFT timing window may be a timing window for converting unicast signals to digital data, and a multicast FFT timing window may be a timing window for converting multicast signals to digital data.

Figure 3C:
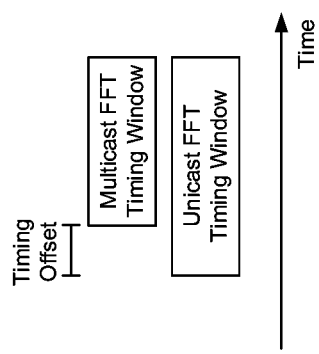

As shown by the example illustrated in FIG. 3C, in some cases, the respective FFT timing windows for unicast traffic reception and multicast traffic reception may have different time durations due to different transmission points involved in unicast and multicast transmission. In these examples, the UE may determine the timing offset between the unicast FFT timing window of the UE and the multicast FFT timing window of the UE and may transmit an indication of the timing offset to the BS.

Figure 3D:
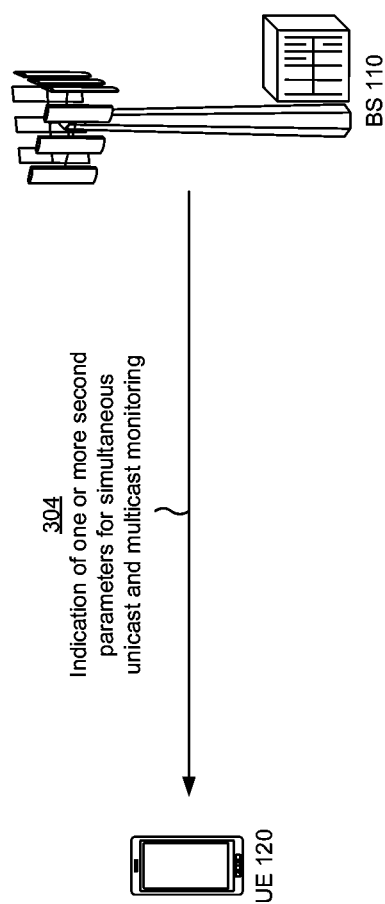

At 304 in FIG. 3D, the BS may receive the one or more first parameters from the UE, may configure, based at least in part on the one or more first parameters, one or more second parameters for simultaneous unicast and multicast monitoring for the UE, and may transmit an indication of the one or more second parameters to the UE. In some aspects, the one or more second parameters may indicate that the one or more beams for unicast-only monitoring, identified in the one or more first parameters, are configured for unicast-only monitoring resources. In some aspects, the one or more second parameters may indicate that the one or more beams for multicast-only monitoring, identified in the one or more first parameters, are configured for multicast-only monitoring resources. In some aspects, the one or more second parameters may indicate that the one or more beams for simultaneous unicast and multicast monitoring, identified in the one or more first parameters, are configured for simultaneous unicast and multicast monitoring resources.

In some aspects, the one or more second parameters may include an indication of a configuration for resources that are permitted to be flexibly configured for unicast traffic or multicast traffic. In some aspects, the resources that are permitted to be flexibly configured for unicast traffic or multicast traffic may include simultaneous unicast and multicast monitoring resources. In some aspects, the one or more second parameters may identify a quantity of frequency carriers that are aggregated for unicast-only monitoring, a quantity of frequency carriers that are aggregated for multicast-only monitoring, a quantity of frequency carriers that are aggregated for simultaneous unicast and multicast monitoring, or a combination thereof.

Figure 3E:
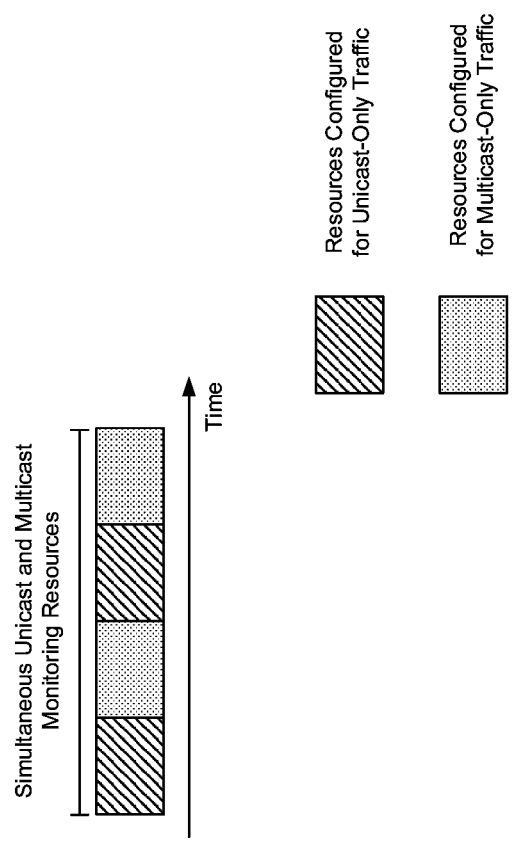
Figure 3F:
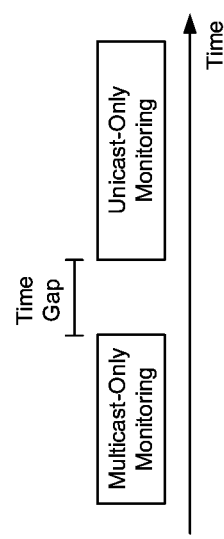

As shown in the example illustrated in FIG. 3E, the indication of the configuration for the flexible resources where the resources can be potentially used for either unicast or multicast transmission may be an early indication (that is, an indication that is transmitted to the UE prior to the occurrence of the respective resources in the time domain) that a subset of the resources are configured for unicast-only traffic and another subset of the resources are configured for multicast-only traffic. The early indication permits the UE to switch between unicast-only monitoring (for example, in the resources configured for unicast-only traffic) and multicast-only monitoring (for example, in the resources configured for multicast-only traffic) within the simultaneous unicast and multicast monitoring resources. This permits the UE to use unicast beams and a unicast FFT timing window for the resources configured for unicast-only traffic, and to use multicast beams and a multicast FFT timing window for the resources configured for multicast-only traffic, which may increase the efficiency of downlink traffic reception at the UE during the simultaneous unicast and multicast monitoring of the resources.

In some aspects, the one or more second parameters may include a time gap between multicast-only monitoring resources and unicast-only monitoring resources configured for the UE (which may or may not be included in a set of simultaneous unicast and multicast monitoring resources). In some aspects, the time gap may be based at least in part on the indication of the timing offset between the unicast FFT timing window and the multicast FFT timing window indicated in the one or more first parameters. The time gap may include one or more OFDM symbols or one or more slots, that permit the UE to switch between using the unicast FFT timing window during the unicast-only monitoring resources and using the multicast FFT timing window during the multicast-only monitoring resources. Moreover, the time gap may permit the UE to perform automatic gain control adjustments, as well as other adjustments, between the unicast-only monitoring resources and the multicast-only monitoring resources.

In some aspects, the BS may transmit the indication of the one or more second parameters to the UE in one or more downlink control information (DCI) communications, one or more medium access control (MAC) control element (MAC-CE) communications, one or more radio resource control (RRC) communications, in DCI included in one or more physical downlink control channel (PDCCH) communications, or a combination thereof. In some aspects, the UE may receive the indication of the one or more second parameters from a plurality of BSs or TRPs.

In some aspects, the UE may receive downlink traffic from the BS based at least in part on the one or more first parameters, the one or more second parameters, other parameters, or a combination thereof. As an example, the UE may monitor for, and may receive, unicast traffic in unicast-only monitoring resources using a unicast FFT timing window, using one or more beams for unicast-only monitoring, or a combination thereof. As another example, the UE may monitor for, and may receive, multicast traffic in multicast-only monitoring resources using a multicast FFT timing window, using one or more beams for multicast-only monitoring, or a combination thereof. As another example, the UE may monitor for and may receive at least one of unicast traffic or multicast traffic in resources with both unicast and multicast monitoring using one or more beams for simultaneous unicast and multicast monitoring.

As another example, the UE may switch between using a unicast FFT timing window in unicast-only monitoring resources and using a multicast FFT timing window in multicast-only monitoring resources during a time gap configured by the BS, may perform automatic gain control adjustments during the time gap, or a combination thereof. As another example, the UE may receive an early indication that simultaneous unicast and multicast monitoring resources are configured into a subset of resources for unicast-only traffic and a subset of resources for multicast-only traffic, and may switch between unicast traffic reception in the resources for unicast-only traffic and multicast traffic reception in the resources for multicast-only traffic.

In some aspects, if the one or more parameters indicate that the UE supports simultaneous unicast and multicast monitoring, the UE may receive unicast traffic and multicast traffic simultaneously, similar to a case where the UE receives multiple PDCCH communications and physical downlink shared channel (PDSCH) communications in a multi-TRP configuration. In these examples, the UE may receive a unicast DCI communication from a unicast TRP and may receive a multicast DCI communication from a multicast TRP. The unicast TRP may be virtual and may include multiple physical TRPs (for example, a first physical TRP set). The multicast TRP may be virtual and may include multiple physical TRPs (for example, a second physical TRP set). The first physical TRP set and the second physical TRP set may or may not have overlapping physical TRPs.

The unicast DCI communication may configure and schedule unicast traffic in a set of simultaneous unicast and multicast monitoring resources, and the multicast DCI communication may configure and schedule multicast traffic in the set of simultaneous unicast and multicast monitoring resources. In some aspects, the unicast DCI communication and the multicast DCI communication may configure the unicast traffic and the multicast traffic such that the unicast traffic and the multicast traffic are transmitted in resources that do not overlap in the time domain or frequency domain.

In some aspects, the unicast DCI communication and the multicast DCI communication may configure the unicast traffic and the multicast traffic such that the unicast traffic and the multicast traffic are transmitted in resources that at least partially or fully overlap in the time domain, in the frequency domain, or a combination thereof. In these examples, to increase the ability of the UE to detect and decode the unicast traffic and the multicast traffic, the unicast TRP and the multicast TRP may respectively transmit a unicast demodulation reference signal (DMRS) associated with the unicast traffic and a multicast DMRS associated with the multicast traffic. The unicast TRP may transmit the unicast DMRS in the resources configured for the unicast traffic, and the multicast TRP may transmit the multicast DMRS in the resources configured for the multicast traffic.

In some aspects, the unicast TRP and the multicast TRP may respectively transmit the unicast DMRS and the multicast DMRS such that the unicast DMRS and the multicast DMRS are included in different code division multiplexing groups. In some aspects, the unicast TRP and the multicast TRP may respectively transmit the unicast traffic and the multicast traffic such that the unicast traffic is rate-matched based at least in part on the multicast DMRS and the multicast traffic is rate-matched based at least in part on the unicast DMRS.

In this way, the one or more first parameters and the one or more second parameters may permit efficient simultaneous unicast and multicast monitoring at the UE. For example, the one or more first parameters and the one or more second parameters may permit the UE to simultaneously monitor for unicast traffic and multicast traffic using a set of beams specifically selected for simultaneous unicast and multicast monitoring. As another example, the timing offset between the FFT timing window for unicast traffic reception and the FFT timing window for multicast traffic reception may provide the UE with sufficient timing to switch between using the FFT timing window for unicast traffic reception and the FFT timing window for multicast traffic reception. As another example, the early indication of the resources configured for unicast traffic and the resources configured for multicast traffic may permit the UE to monitor for unicast-only traffic or for multicast-only traffic in subsets of resources that are permitted to be flexibly configured for unicast traffic or multicast traffic.

Figure 4:
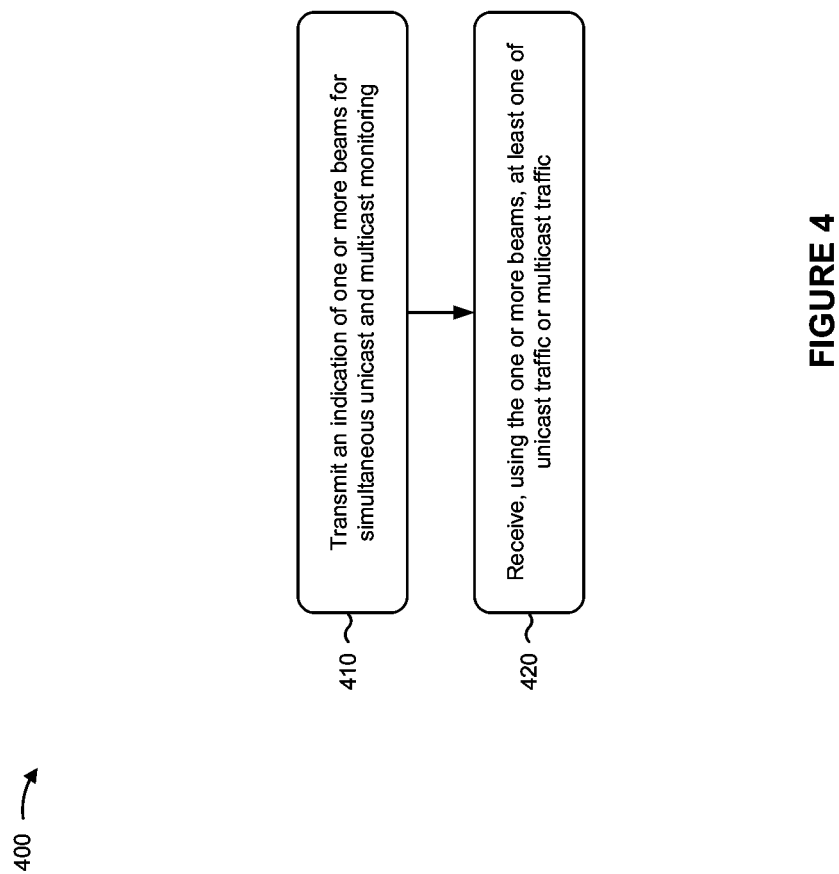
FIGS. 4 and 5 are diagrams illustrating example processes for supporting simultaneous unicast and multicast monitoring performed by a UE in accordance with various aspects of the present disclosure.

FIG. 4 is a diagram illustrating an example process 400 performed by a UE, in accordance with various aspects of the present disclosure. In the example process 400, the UE (such as UE 120) performs operations associated with supporting simultaneous unicast and multicast monitoring. As shown in FIG. 4, in some aspects, the example process 400 may include transmitting an indication of one or more beams for simultaneous unicast and multicast monitoring (block 410). For example, the UE (for example, using receive processor 258, transmit processor 264, controller/processor 280, memory 282, or the like, or a combination thereof) may transmit an indication of one or more beams for simultaneous unicast and multicast monitoring, as described above.

As further shown in FIG. 4, in some aspects, the example process 400 may include receiving, using the one or more beams, at least one of unicast traffic or multicast traffic (block 420). For example, the UE (for example, using receive processor 258, transmit processor 264, controller/processor 280, memory 282, or the like, or a combination thereof) may receive, using the one or more beams, at least one of unicast traffic or multicast traffic, as described above.

The example process 400 may include additional aspects, such as any single aspect or any combination of aspects described below and/or in connection with one or more other processes described elsewhere herein. In a first additional aspect, the example process 400 may include transmitting an indication of one or more other beams for unicast-only monitoring, and receiving, using the one or more other beams, unicast traffic in one or more unicast-only monitoring resources. In a second additional aspect, alone or in combination with the first aspect, the example process 400 may include transmitting an indication of one or more other beams for multicast-only monitoring, and receiving, using the one or more other beams, multicast traffic in one or more multicast-only monitoring resources.

Figure 5:
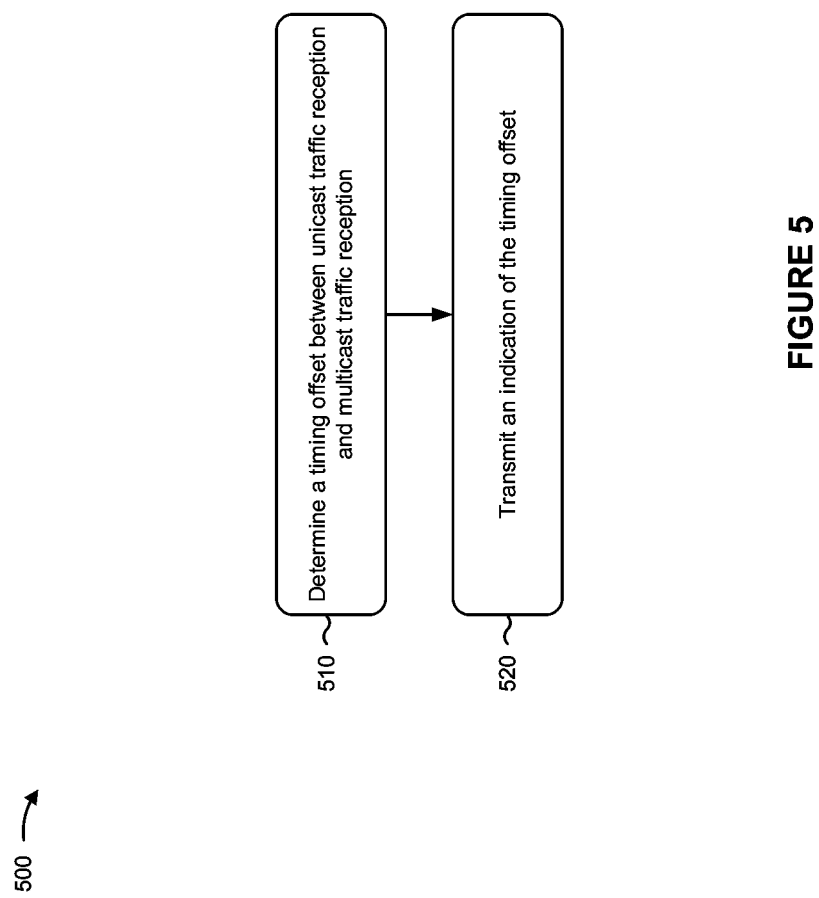

FIG. 5 is a diagram illustrating an example process 500 performed, for example, by a UE, in accordance with various aspects of the present disclosure. In the example process 500, the UE (such as a UE 120) performs operations associated with supporting simultaneous unicast and multicast monitoring. As shown in FIG. 5, in some aspects, the example process 500 may include determining a timing offset between unicast traffic reception and multicast traffic reception (block 510). For example, the UE (for example, using receive processor 258, transmit processor 264, controller/processor 280, memory 282, or the like, or a combination thereof) may determine a timing offset between unicast traffic reception and multicast traffic reception, as described above.

As further shown in FIG. 5, in some aspects, the example process 500 may include transmitting an indication of the timing offset (block 520). For example, the UE (for example, using receive processor 258, transmit processor 264, controller/processor 280, memory 282, or the like, or a combination thereof) may transmit an indication of the timing offset, as described above.

The process 500 may include additional aspects, such as any single aspect or any combination of aspects described below and/or in connection with one or more other processes described elsewhere herein.

In a first additional aspect, the example process 500 includes receiving, based at least in part on the timing offset, an indication of a time gap between one or more first time-domain resources configured for unicast traffic and one or more second time-domain resources configured for multicast traffic. In a second additional aspect, alone or in combination with the first aspect, process 500 includes adjusting an automatic gain control of the UE during the time gap.

Figure 6:
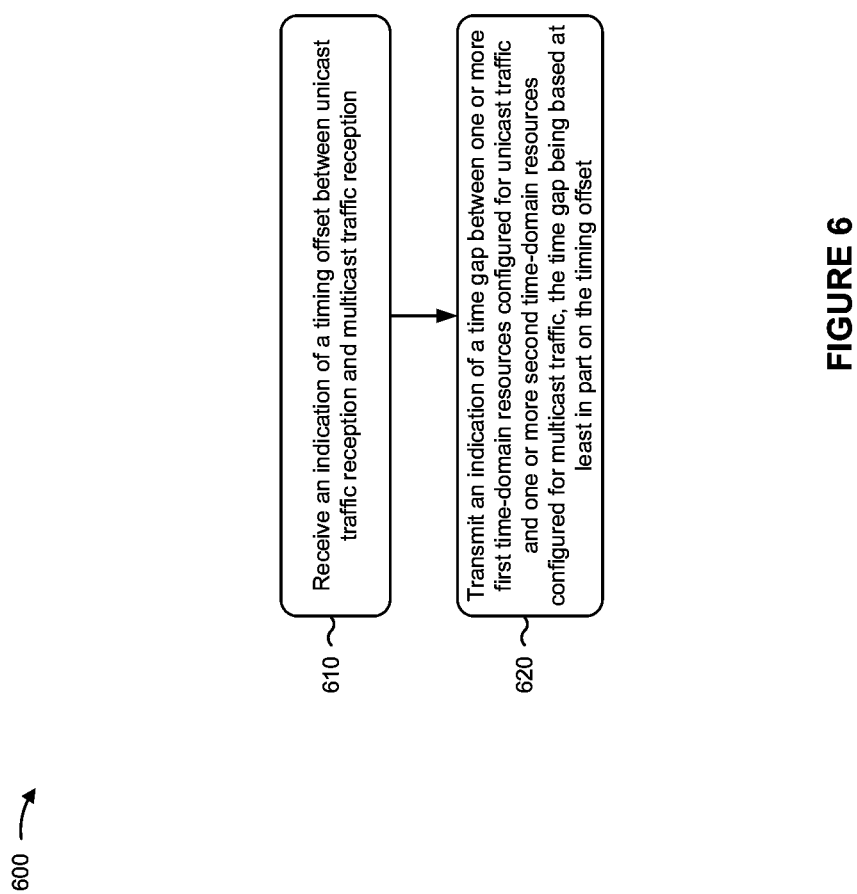
FIGS. 6 and 7 are diagrams illustrating example processes for supporting simultaneous unicast and multicast monitoring performed by a BS in accordance with various aspects of the present disclosure.

FIG. 6 is a diagram illustrating an example process 600 performed, for example, by a BS, in accordance with various aspects of the present disclosure. In the example process 600, the BS (such as BS 110) performs operations associated with supporting simultaneous unicast and multicast monitoring. As shown in FIG. 6, in some aspects, the example process 600 may include receiving an indication of a timing offset between unicast traffic reception and multicast traffic reception (block 610). For example, the BS (for example, using transmit processor 220, receive processor 238, controller/processor 240, memory 242, or the like, or a combination thereof) may receive an indication of a timing offset between unicast traffic reception and multicast traffic reception, as described above.

As further shown in FIG. 6, in some aspects, the example process 600 may include transmitting an indication of a time gap between one or more first time-domain resources configured for unicast traffic and one or more second time-domain resources configured for multicast traffic, the time gap being based at least in part on the timing offset (block 620). For example, the BS (for example, using transmit processor 220, receive processor 238, controller/processor 240, memory 242, or the like, or a combination thereof) may transmit an indication of a time gap between one or more first time-domain resources configured for unicast traffic and one or more second time-domain resources configured for multicast traffic, the time gap being based at least in part on the timing offset, as described above.

The process 600 may include additional aspects, such as any single aspect or any combination of aspects described below and/or in connection with one or more other processes described elsewhere herein.

Figure 7:
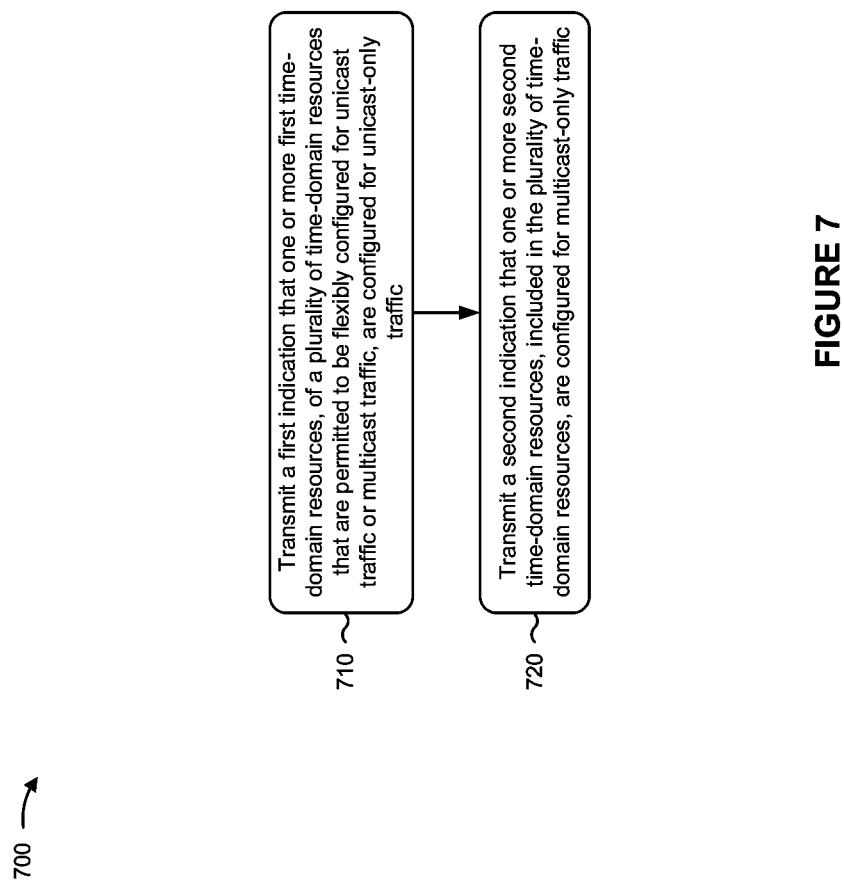

FIG. 7 is a diagram illustrating an example process 700 performed, for example, by a BS, in accordance with various aspects of the present disclosure. In the example process 700, the BS (such as BS 110) performs operations associated with supporting simultaneous unicast and multicast monitoring. As shown in FIG. 7, in some aspects, the example process 700 may include transmitting a first indication that one or more first time-domain resources, of a plurality of time-domain resources that are permitted to be flexibly configured for unicast traffic or multicast traffic, are configured for unicast-only traffic (block 710). For example, the BS (for example, using transmit processor 220, receive processor 238, controller/processor 240, memory 242, or the like, or a combination thereof) may transmit a first indication that one or more first time-domain resources, of a plurality of time-domain resources that are permitted to be flexibly configured for unicast traffic or multicast traffic, are configured for unicast-only traffic, as described above.

As further shown in FIG. 7, in some aspects, the process 700 may include transmitting a second indication that one or more second time-domain resources, included in the plurality of time-domain resources, are configured for multicast-only traffic (block 720). For example, the BS (for example, using transmit processor 220, receive processor 238, controller/processor 240, memory 242, or the like, or a combination thereof) may transmit a second indication that one or more second time-domain resources, included in the plurality of time-domain resources, are configured for multicast-only traffic, as described above.

Process 700 may include additional aspects, such as any single aspect or any combination of aspects described below and/or in connection with one or more other processes described elsewhere herein. In a first additional aspect, transmitting the first indication and the second indication comprises transmitting the first indication and the second indication in downlink control information included in a physical downlink control channel communication. In a second additional aspect, alone or in combination with the first aspect, the example process includes transmitting unicast traffic in the one or more first time-domain resources; and transmitting multicast traffic in the one or more second time-domain resources. In a third additional aspect, alone or in combination with one or more of the first and second aspects, the one or more first time-domain resources comprise at least one of one or more first slots or one or more first symbols, and the one or more second time-domain resources comprise at least one of one or more second slots or one or more second symbols.

Figure 8:
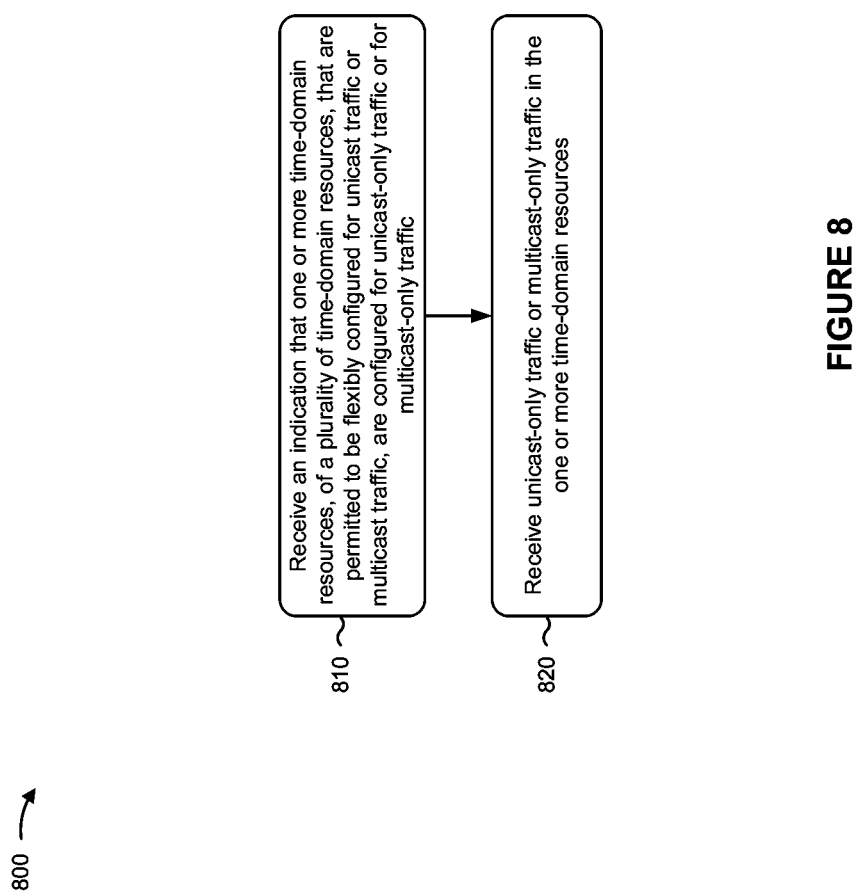
FIGS. 8-10 are diagrams illustrating example processes for supporting simultaneous unicast and multicast monitoring performed by a UE in accordance with various aspects of the present disclosure.

FIG. 8 is a diagram illustrating an example process 800 performed, for example, by a UE, in accordance with various aspects of the present disclosure. In the example process 800, the UE (such as UE 120) performs operations associated with supporting simultaneous unicast and multicast monitoring. As shown in FIG. 8, in some aspects, the example process 800 may include receiving an indication that one or more time-domain resources, of a plurality of time-domain resources, that are permitted to be flexibly configured for unicast traffic or multicast traffic, are configured for unicast-only traffic or for multicast-only traffic (block 810). For example, the UE (for example, using receive processor 258, transmit processor 264, controller/processor 280, memory 282, or the like, or a combination thereof) may receive an indication that one or more time-domain resources, of a plurality of time-domain resources, that are permitted to be flexibly configured for unicast traffic or multicast traffic, are configured for unicast-only traffic or for multicast-only traffic, as described above.

As further shown in FIG. 8, in some aspects, the example process 800 may include receiving unicast-only traffic or multicast-only traffic in the one or more time-domain resources (block 820). For example, the UE (for example, using receive processor 258, transmit processor 264, controller/processor 280, memory 282, or the like, or a combination thereof) may receive unicast-only traffic or multicast-only traffic in the one or more time-domain resources, as described above.

Process 800 may include additional aspects, such as any single aspect or any combination of aspects described below and/or in connection with one or more other processes described elsewhere herein. In a first additional aspect, the indication is an indication that the one or more time-domain resources are configured for unicast-only traffic, and wherein receiving unicast-only traffic or multicast-only traffic in the one or more time-domain resources comprises receiving unicast-only traffic in the one or more time-domain resources, and process 800 further includes receiving another indication that one or more other time-domain resources, of the plurality of time-domain resources, are configured for multicast-only traffic and receiving multicast-only traffic in the one or more other time-domain resources.

In a second additional aspect, alone or in combination with the first aspect, receiving the unicast traffic in the one or more time-domain resources comprises receiving the unicast traffic using one or more unicast beams and using a unicast FFT timing window. In a third additional aspect, alone or in combination with one or more of the first or second aspects, receiving the multicast traffic in the one or more other time-domain resources comprises receiving the multicast traffic using one or more multicast beams and using a multicast FFT timing window.

In a fourth additional aspect, alone or in combination with one or more of the first through third aspects, the one or more time-domain resources comprise at least one of one or more first slots or one or more first symbols, and the one or more other time-domain resources comprise at least one of one or more second slots or one or more second symbols.

Figure 9:
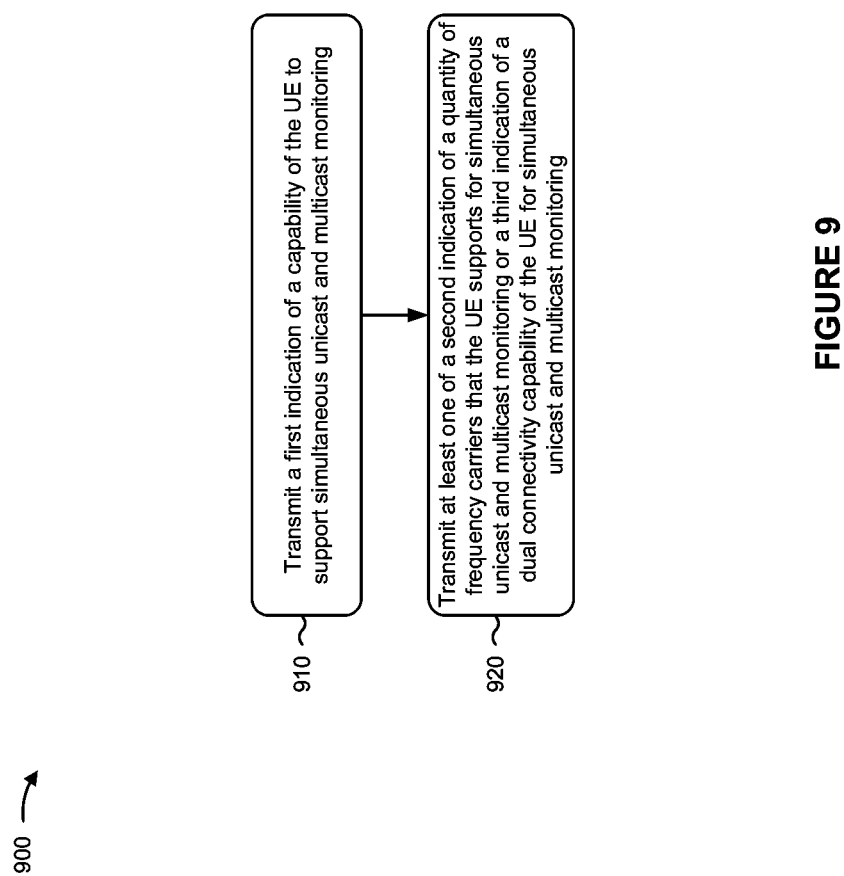

FIG. 9 is a diagram illustrating an example process 900 performed, for example, by a UE, in accordance with various aspects of the present disclosure. In the example process 900, the UE (such as UE 120) performs operations associated with support of simultaneous unicast and multicast monitoring. As shown in FIG. 9, in some aspects, the example process 900 may include transmitting a first indication of a capability of the UE to support simultaneous unicast and multicast monitoring (block 910). For example, the UE (for example, using receive processor 258, transmit processor 264, controller/processor 280, memory 282, or the like, or a combination thereof) may transmit a first indication of a capability of the UE to support simultaneous unicast and multicast monitoring, as described above.

As further shown in FIG. 9, in some aspects, the example process 900 may include transmitting at least one of a second indication of a quantity of frequency carriers that the UE supports for simultaneous unicast and multicast monitoring or a third indication of a dual connectivity capability of the UE for simultaneous unicast and multicast monitoring (block 920). For example, the UE (for example, using receive processor 258, transmit processor 264, controller/processor 280, memory 282, or the like, or a combination thereof) may transmit at least one of a second indication of a quantity of frequency carriers that the UE supports for simultaneous unicast and multicast monitoring or a third indication of a dual connectivity capability of the UE for simultaneous unicast and multicast monitoring, as described above.

Process 900 may include additional aspects, such as any single aspect or any combination of aspects described below and/or in connection with one or more other processes described elsewhere herein.

Figure 10:
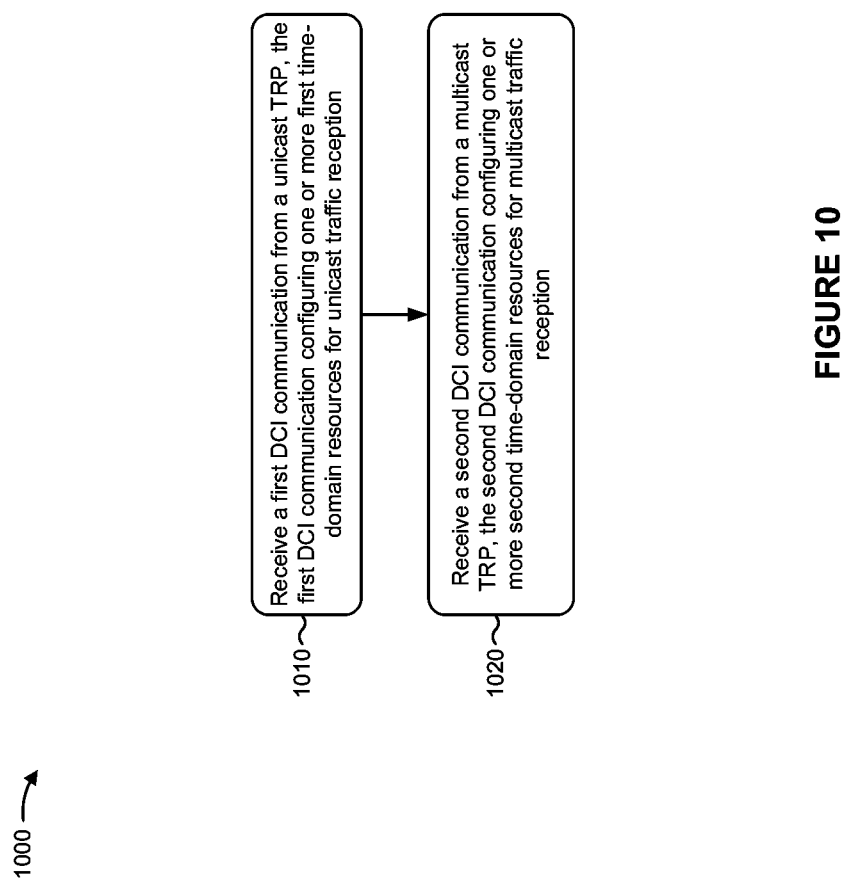

FIG. 10 is a diagram illustrating an example process 1000 performed, for example, by a UE, in accordance with various aspects of the present disclosure. In the example process 1000, the UE (such as UE 120) performs operations associated with support of simultaneous unicast and multicast monitoring. As shown in FIG. 10, in some aspects, the example process 1000 may include receiving a first DCI communication from a unicast TRP, the first DCI communication configuring one or more first time-domain resources for unicast traffic reception (block 1010). For example, the UE (for example, using receive processor 258, transmit processor 264, controller/processor 280, memory 282, or the like, or a combination thereof) may receive a first DCI communication from a unicast TRP, the first DCI communication configuring one or more first time-domain resources for unicast traffic reception, as described above.

As further shown in FIG. 10, in some aspects, the example process 1000 may include receiving a second DCI communication from a multicast TRP, the second DCI communication configuring one or more second time-domain resources for multicast traffic reception (block 1020). For example, the UE (for example, using receive processor 258, transmit processor 264, controller/processor 280, memory 282, or the like, or a combination thereof) may receive a second DCI communication from a multicast TRP, the second DCI communication configuring one or more second time-domain resources for multicast traffic reception, as described above.

Process 1000 may include additional aspects, such as any single aspect or any combination of aspects described below and/or in connection with one or more other processes described elsewhere herein.

In a first additional aspect, the one or more first time-domain resources and the one or more second time-domain resources do not overlap in a frequency domain. In an second additional aspect, alone or in combination with the first aspect, the one or more first time-domain resources and the one or more second time-domain resources at least partially overlap in a frequency domain and a time domain, and the method further comprises receiving a unicast DMRS in the one or more first time-domain resources and receiving a multicast DMRS in the one or more second time-domain resources, the unicast DMRS and the multicast DMRS being in different code division multiplexing groups.

In a third additional aspect, alone or in combination with one or more of the first or second aspects, the example process includes receiving, in the one or more first time-domain resources, unicast traffic that is rate-matched based at least in part on the multicast DMRS; and receiving, in the one or more second time-domain resources, multicast traffic that is rate-matched based at least in part on the unicast DMRS.

Figure 11:
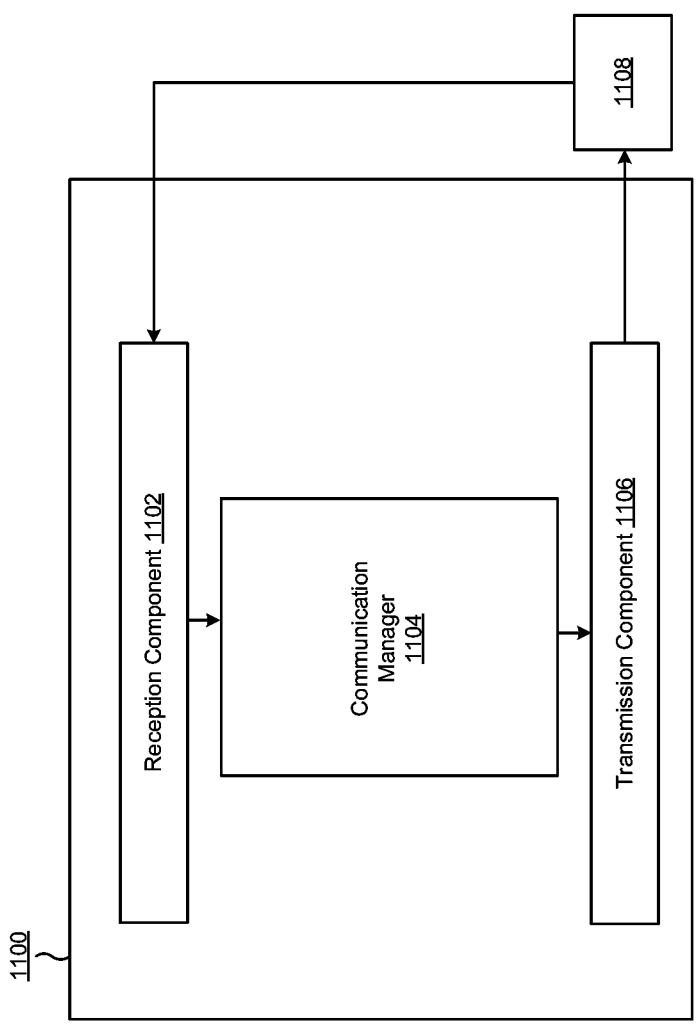
FIGS. 11-14 are block diagrams of example apparatuses for wireless communication in accordance with various aspects of the present disclosure.

FIG. 11 is a block diagram of an example apparatus 1100 for wireless communication in accordance with various aspects of the present disclosure. The apparatus 1100 may be a UE 120, or a UE 120 may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, a TRP, or another wireless communication device) using the reception component 1102 and the transmission component 1106.

In some aspects, the apparatus 1100 may be configured to perform one or more operations described herein in connection with FIGS. 3A-3F. Additionally or alternatively, the apparatus 1100 may be configured to perform one or more processes described herein, such as process 400 of FIG. 4. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG. 2. In some aspects, the transmission component 1106 may be co-located with the reception component 1102 in a transceiver.

In some aspects, the communication manager 1104 may transmit (or may cause the transmission component 1106 to transmit) an indication of one or more beams for simultaneous unicast and multicast monitoring to the apparatus 1108. In some aspects, the communication manager 1104 may receive (or may cause the reception component 1102 to receive), using the one or more beams, at least one of unicast traffic or multicast traffic from the apparatus 1108. In some aspects, the communication manager 1104 may transmit (or may cause the transmission component 1106 to transmit) an indication of one or more other beams for unicast-only monitoring to the apparatus 1108. In some aspects, the communication manager 1104 may receive (or may cause the reception component 1102 to receive), using the one or more other beams, unicast traffic in one or more unicast-only monitoring resources from the apparatus 1108. In some aspects, the communication manager 1104 may transmit (or may cause the transmission component 1106 to transmit) an indication of one or more other beams for multicast-only monitoring to the apparatus 1108. In some aspects, the communication manager 1104 may receive (or may cause the reception component 1102 to receive), using the one or more other beams, multicast traffic in one or more multicast-only monitoring resources from the apparatus 1108.

In some aspects, the communication manager 1104 may include a controller/processor, a memory, or a combination thereof, of the UE described above in connection with FIG. 2. In some aspects, the communication manager 1104 may include a set of components. Alternatively, the set of components may be separate and distinct from the communication manager 1104. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
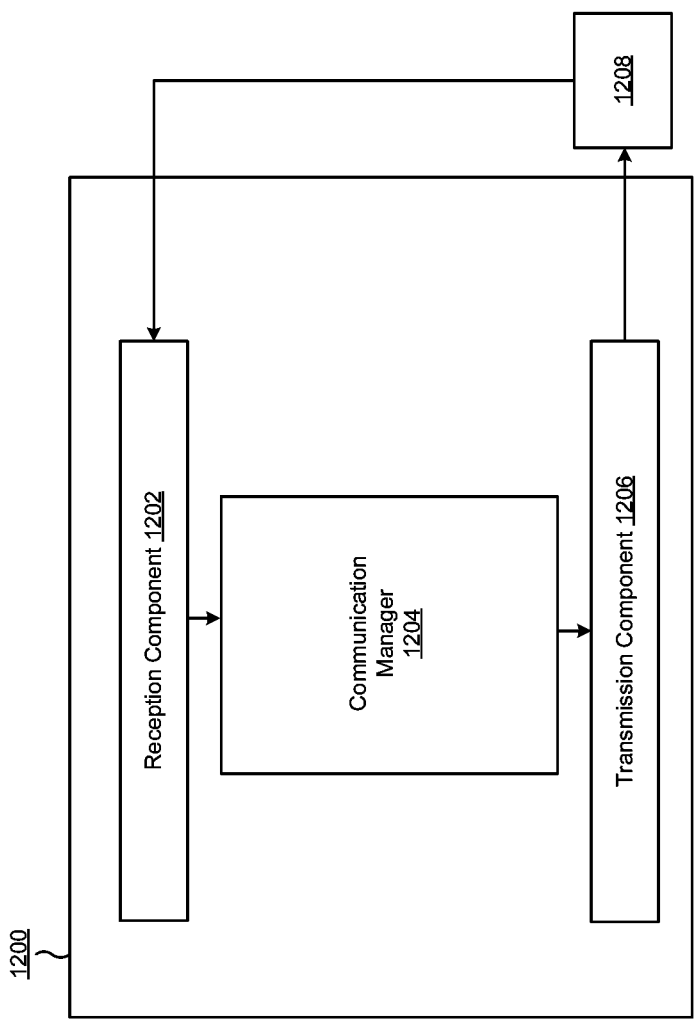

FIG. 12 is a block diagram of an example apparatus 1200 for wireless communication in accordance with various aspects of the present disclosure. In some aspects, the apparatus 1200 may be a base station 110. In some aspects, a base station 110 may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 3A-3F. Additionally or alternatively, the apparatus 1200 may be configured to perform one or more processes described herein, such as process 700 of FIG. 7 or a combination thereof. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

In some aspects, the communication manager 1204 may transmit (or may cause the transmission component 1206 to transmit) a first indication to the apparatus 1208 that one or more first time-domain resources, of a plurality of time-domain resources that are permitted to be flexibly configured for unicast traffic or multicast traffic, are configured for unicast-only traffic. In some aspects, the communication manager 1204 may transmit (or may cause the transmission component 1206 to transmit) a second indication to the apparatus 1208 that one or more second time-domain resources, included in the plurality of time-domain resources, are configured for multicast-only traffic. In some aspects, the communication manager 1204 may transmit (or may cause the transmission component 1206 to transmit) unicast traffic to the apparatus 1208 in the one or more first time-domain resources. In some aspects, the communication manager 1204 may transmit (or may cause the transmission component 1206 to transmit) multicast traffic to the apparatus 1208 in the one or more second time-domain resources.

In some aspects, the communication manager 1204 may include a controller/processor, a memory, a scheduler, a communication unit, or a combination thereof, of the base station described above in connection with FIG. 2. In some aspects, the communication manager 1204 may include a set of components. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
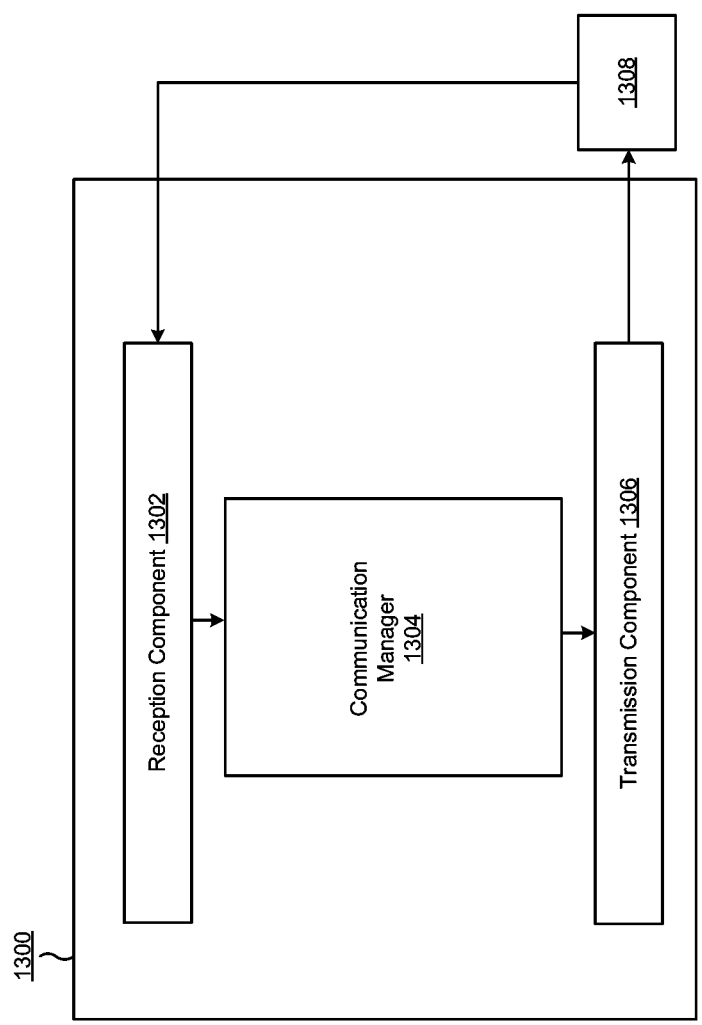

FIG. 13 is a block diagram of an example apparatus 1300 for wireless communication in accordance with various aspects of the present disclosure. The apparatus 1300 may be a UE 120, or a UE 120 may include the apparatus 1300. In some aspects, the apparatus 1300 includes a reception component 1302, a communication manager 1304, and a transmission component 1106, which may be in communication with one another (for example, via one or more buses). As shown, the apparatus 1300 may communicate with another apparatus 1308 (such as a UE, a base station, a TRP, or another wireless communication device) using the reception component 1302 and the transmission component 1306.

In some aspects, the apparatus 1300 may be configured to perform one or more operations described herein in connection with FIGS. 3A-3F. Additionally or alternatively, the apparatus 1300 may be configured to perform one or more processes described herein, such as process 800 of FIG. 8. In some aspects, the apparatus 1300 may include one or more components of the UE described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the UE described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the UE described above in connection with FIG. 2. In some aspects, the transmission component 1306 may be co-located with the reception component 1302 in a transceiver.

In some aspects, the communication manager 1304 may receive (or may cause the reception component 1302 to receive) an indication from the apparatus 1308 that one or more time-domain resources, of a plurality of time-domain resources, that are permitted to be flexibly configured for unicast traffic or multicast traffic, are configured for unicast-only traffic or for multicast-only traffic. In some aspects, the communication manager 1304 may receive (or may cause the reception component 1302 to receive) unicast-only traffic or multicast-only traffic from the apparatus 1308 in the one or more time-domain resources.

In some aspects, the communication manager 1304 may include a controller/processor, a memory, or a combination thereof, of the UE described above in connection with FIG. 2. In some aspects, the communication manager 1304 may include a set of components. Alternatively, the set of components may be separate and distinct from the communication manager 1304. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
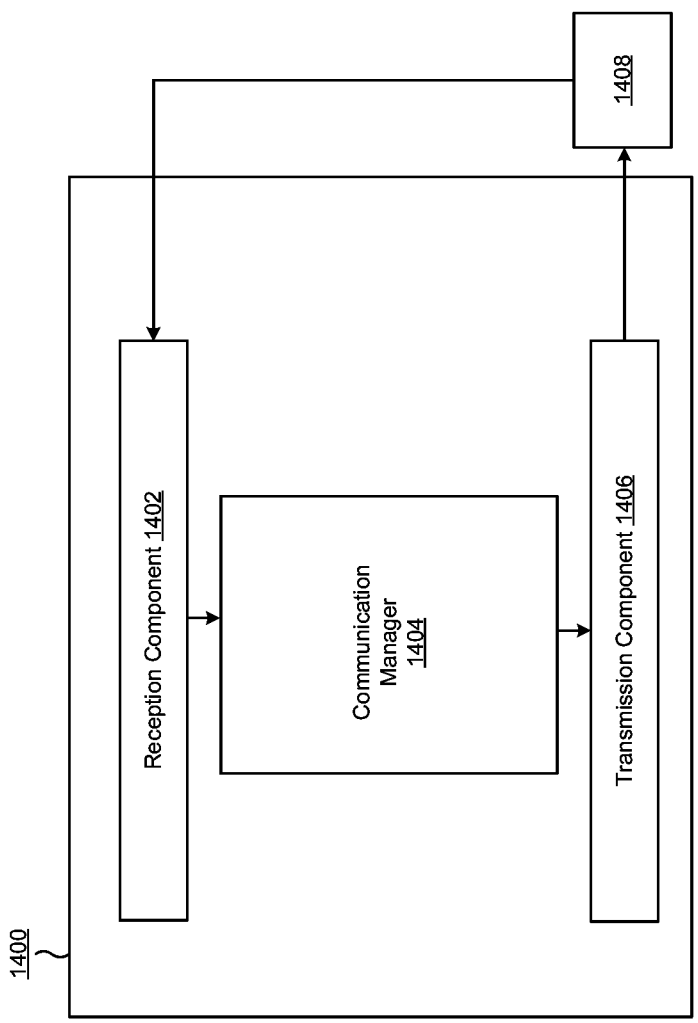

FIG. 14 is a block diagram of an example apparatus 1400 for wireless communication in accordance with various aspects of the present disclosure. The apparatus 1400 may be a UE 120, or a UE 120 may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, a TRP, or another wireless communication device) using the reception component 1402 and the transmission component 1406.

In some aspects, the apparatus 1400 may be configured to perform one or more operations described herein in connection with FIGS. 3A-3F. Additionally or alternatively, the apparatus 1400 may be configured to perform one or more processes described herein, such as process 900 of FIG. 9. In some aspects, the apparatus 1400 may include one or more components of the UE described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the UE described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the UE described above in connection with FIG. 2. In some aspects, the transmission component 1406 may be co-located with the reception component 1402 in a transceiver.

In some aspects, the communication manager 1404 may transmit (or may cause the transmission component 1406 to transmit) a first indication to the apparatus 1408 of a capability of the UE to support simultaneous unicast and multicast monitoring. In some aspects, the communication manager 1404 may transmit (or may cause the transmission component 1406 to transmit) at least one of a second indication of a quantity of frequency carriers that the apparatus 1400 supports for simultaneous unicast and multicast monitoring or a third indication of a dual connectivity capability of the apparatus 1400 for simultaneous unicast and multicast monitoring to the apparatus 1408. In some aspects, the communication manager 1404 may receive (or may cause the reception component 1402 to receive) a first DCI communication from a unicast apparatus 1408, the first DCI communication configuring one or more first time-domain resources for unicast traffic reception. In some aspects, the communication manager 1404 may receive (or may cause the reception component 1402 to receive) a second DCI communication from a multicast apparatus 1408, the second DCI communication configuring one or more second time-domain resources for multicast traffic reception.

In some aspects, the communication manager 1404 may receive (or may cause the reception component 1402 to receive) a unicast DMRS in the one or more first time-domain resources. In some aspects, the communication manager 1404 may receive (or may cause the reception component 1402 to receive) a multicast DMRS in the one or more second time-domain resources, the unicast DMRS and the multicast DMRS being in different code division multiplexing groups. In some aspects, the communication manager 1404 may receive (or may cause the reception component 1402 to receive), in the one or more first time-domain resources, unicast traffic that is rate-matched based at least in part on the multicast DMRS. In some aspects, the communication manager 1404 may receive (or may cause the reception component 1402 to receive), in the one or more second time-domain resources, multicast traffic that is rate-matched based at least in part on the unicast DMRS.

In some aspects, the communication manager 1404 may include a controller/processor, a memory, or a combination thereof, of the UE described above in connection with FIG. 2. In some aspects, the communication manager 1404 may include a set of components. Alternatively, the set of components may be separate and distinct from the communication manager 1404. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors coupled to the memory, the one or more processors configured to:
transmit a first indication of one or more first parameters indicating one or more first beams for simultaneous unicast and multicast monitoring, one or more second beams for unicast-only monitoring, and one or more third beams for multicast-only monitoring;
receive a second indication of one or more second parameters indicating at least one of the one or more first beams being configured for one or more simultaneous unicast and multicast monitoring resources, the one or more second beams being configured for one or more unicast-only monitoring resources, or the one or more third beams being configured for one or more multicast-only monitoring resources,
the one or more second parameters including a time gap between the one or more unicast-only monitoring resources and the one or more multicast-only monitoring resources; and
receive, based at least in part on the one or more first parameters and the one or more second parameters, and using at least one of the one or more first beams, the one or more second beams, or the one or more third beams, at least one of unicast traffic or multicast traffic.

2. The UE of claim 1, wherein the one or more processors are configured to when receiving at least one of the unicast traffic or the multicast traffic:
receive, using the one or more second beams, the unicast traffic in the one or more unicast-only monitoring resources.

3. The UE of claim 1, wherein the one or more processors are configured to when receiving at least one of the unicast traffic or the multicast traffic:
receive, using the one or more third beams, the multicast traffic in the one or more multicast-only monitoring resources.

4. The UE of claim 1, wherein the one or more processors are configured to when receiving at least one of the unicast traffic or the multicast traffic:
receive, using the one or more first beams, the unicast traffic and the multicast traffic in the one or more simultaneous unicast and multicast monitoring resources.

5. The UE of claim 1, wherein the one or more second parameters indicate at least one of a first quantity of frequency carriers that are aggregated for unicast-only monitoring, a second quantity of frequency carriers that are aggregated for multicast-only monitoring, or a third quantity of frequency carriers that are aggregated for simultaneous unicast and multicast monitoring.

6. A network entity for wireless communication, comprising:
a memory; and
one or more processors coupled to the memory, the one or more processors configured to:
transmit a first indication that a first subset of time-domain resources, of a plurality of time-domain resources that are permitted to be flexibly configured for unicast traffic or multicast traffic, are configured for unicast-only traffic;
transmit a second indication that a second subset of time-domain resources, of the plurality of time-domain resources that are permitted to be flexibly configured for the unicast traffic or the multicast traffic, are configured for multicast-only traffic;
transmit a third indication of a time gap between the first subset of time-domain resources and the second subset of time-domain resources; and
transmit, based on of the first indication, the second indication, and the third indication, the unicast traffic in the first subset of time-domain resources and the multicast traffic in the second subset of time-domain resource.

7. The network entity of claim 6, wherein the one or more processors, to transmit the first indication and the second indication, are configured to transmit the first indication and the second indication in downlink control information included in a physical downlink control channel communication.

8. The network entity of claim 6, wherein the first subset of time-domain resources comprise at least one of one or more first slots or one or more first symbols, and wherein the second subset of time-domain resources comprise at least one of one or more second slots or one or more second symbols.

9. The network entity of claim 6, wherein the one or more processors, to transmit the unicast traffic in the first subset of time-domain resources, are configured to transmit the unicast traffic using one or more unicast beams and using a unicast fast Fourier transform (FFT) timing window.

10. The network entity of claim 6, wherein the one or more processors, to transmit the multicast traffic in the second subset of time-domain resources, are configured to transmit the multicast traffic using one or more multicast beams and using a multicast FFT timing window.

11. A user equipment (UE) for wireless communication, comprising:
a memory; and
one or more processors coupled to the memory, the one or more processors configured to:
receive a first indication that a first subset of time-domain resources, of a plurality of time-domain resources that are permitted to be flexibly configured for unicast traffic or multicast traffic, are configured for unicast-only traffic;
receive a second indication that a second subset of time-domain resources, of the plurality of time-domain resources that are permitted to be flexibly configured for the unicast traffic or the multicast traffic, are configured for multicast-only traffic;
receive a third indication of a time gap between the first subset of time-domain resources and the second subset of time-domain resources; and
receive, based on the first indication, the second indication, and the third indication, the unicast traffic in the first subset of time-domain resources and the multicast traffic in the second subset of time-domain resource.

12. The UE of claim 11, wherein the one or more processors, to receive the first indication and the second indication, are configured to receive the first indication and the second indication in downlink control information included in a physical downlink control channel communication.

13. The UE of claim 11, wherein the one or more processors, to receive the unicast traffic in the one or more first subset of time-domain resources, are configured to receive the unicast traffic using one or more unicast beams and using a unicast fast Fourier transform (FFT) timing window.

14. The UE of claim 11, wherein the one or more processors, to receive the multicast traffic in the one or more second subset of time-domain resources, are configured to receive the multicast traffic using one or more multicast beams and using a multicast fast Fourier transform (FFT) timing window.

15. The UE of claim 11, wherein the first subset of time-domain resources comprise at least one of one or more first slots or one or more first symbols.

16. The UE of claim 15, wherein the second subset of time-domain resources comprise at least one of one or more second slots or one or more second symbols.

17. A user equipment (UE) for wireless communication, comprising:
a memory; and
one or more processors coupled to the memory, the one or more processors configured to:
transmit a first indication of a capability of the UE to support simultaneous unicast and multicast monitoring;
transmit at least one of a second indication of a quantity of frequency carriers that the UE is capable of supporting while simultaneously monitoring for unicast traffic and multicast traffic or a third indication of a capability of the UE to support dual connectivity while simultaneously monitoring for the unicast traffic and the multicast traffic;
receive a fourth indication that permits switching between unicast-only monitoring and multicast-only monitoring within simultaneous unicast and multicast monitoring resources; and
receive, based at least in part on, the first indication, at least one of the second indication or the third indication, and the fourth indication, at least one of the unicast traffic or the multicast traffic.

18. The UE of claim 17, wherein the one or more processors are further configured to:
receive a first downlink control information (DCI) communication from a unicast transmission reception point (TRP), the first DCI communication configuring one or more first time-domain resources for unicast traffic reception; and
receive a second DCI communication from a multicast TRP, the second DCI communication configuring one or more second time-domain resources for multicast traffic reception.

19. The UE of claim 18, wherein the one or more first time-domain resources and the one or more second time-domain resources do not overlap in a frequency domain.

20. The UE of claim 18, wherein the one or more first time-domain resources and the one or more second time-domain resources at least partially overlap in a frequency domain and a time domain.

21. The UE of claim 20, wherein the one or more processors are further configured to receive a unicast demodulation reference signal (DMRS) in the one or more first time-domain resources.

22. The UE of claim 21, wherein the one or more processors are further configured to receive a multicast DMRS in the one or more second time-domain resources, the unicast DMRS and the multicast DMRS being in different code division multiplexing groups.

23. The UE of claim 22, wherein the one or more processors, to receive the unicast traffic, are further configured to receive, in the one or more first time-domain resources, unicast traffic that is rate-matched based at least in part on the multicast DMRS.

24. The UE of claim 23, wherein the one or more processors, to receive the multicast traffic, are further configured to receive, in the one or more second time-domain resources, multicast traffic that is rate-matched based at least in part on the unicast DMRS.

* * * * *